Figure 3:
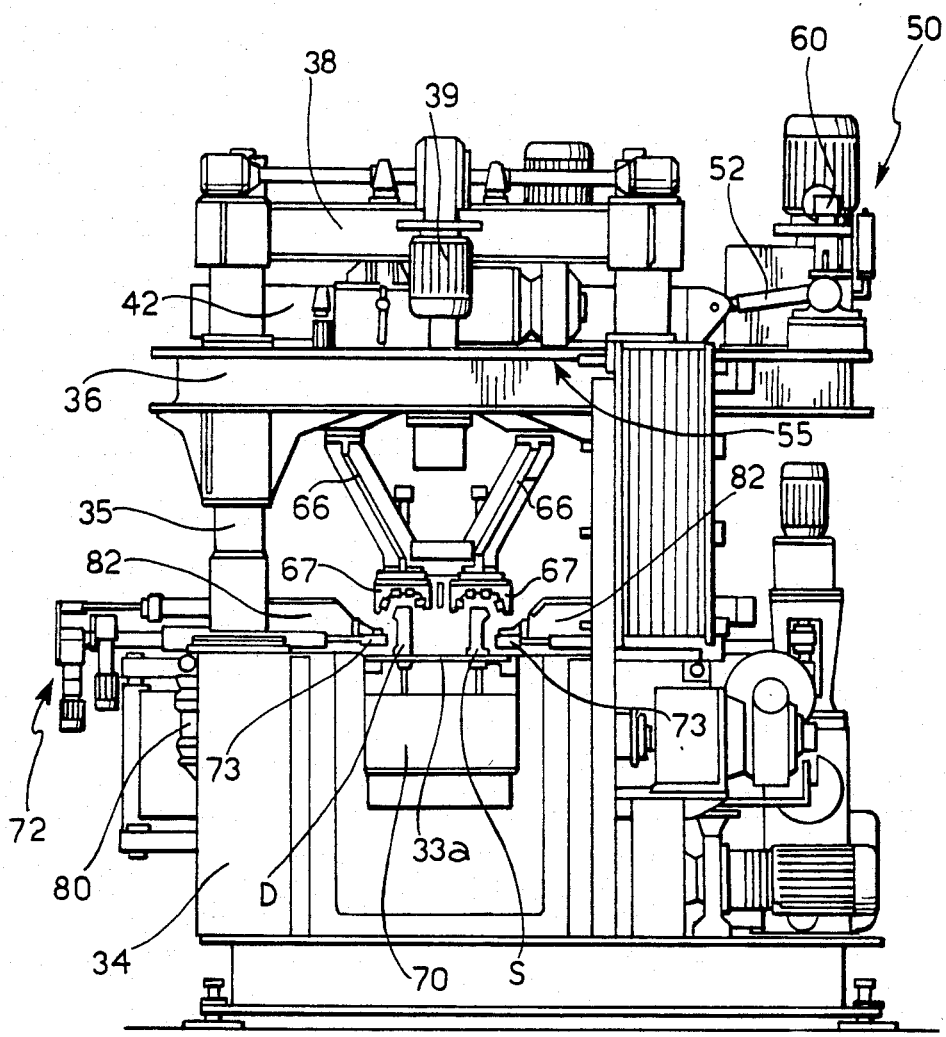

United States Patent [19]

Damiani

[11] Patent Number: 4,673,785
[45] Date of Patent: Jun. 16, 1987

[54] AUTOMATIC APPARATUS FOR INDUCTION HARDENING

[75] Inventor: Fernando Damiani, Turin, Italy

[73] Assignee: COMAU S.p.A., Grugliasco, Italy

[21] Appl. No.: 878,786

[22] Filed: Jun. 26, 1986

[30] Foreign Application Priority Data

Jul. 3, 1985 [IT] Italy .............................. 67613 A/85

[51] Int. Cl.⁴ .............................................. H05B 6/40
[52] U.S. Cl. ............................... 219/10.57; 219/10.69;
219/10.79; 219/10.75
[58] Field of Search ............... 219/10.57, 10.69, 10.71,
219/10.67, 10.75, 10.77, 10.73, 10.43, 9910.61
R, 10.49 R

[56] References Cited

U.S. PATENT DOCUMENTS

| | | | |
|---|---|---|---|
| 2,448,009 | 8/1948 | Baker | 219/10.61 R |
| 4,258,241 | 3/1981 | Soworowski | 219/10.71 |
| 4,289,944 | 9/1981 | Reese | 219/10.75 X |
| 4,307,276 | 12/1981 | Kurata et al. | 219/10.77 X |
| 4,315,124 | 2/1982 | Granstrom et al. | 219/10.71 |
| 4,321,444 | 3/1982 | Davies | 219/10.71 X |
| 4,585,916 | 4/1986 | Rich | 219/10.61 R |

Primary Examiner—Philip H. Leung
Attorney, Agent, or Firm—Fred A. Keire

[57] ABSTRACT

Automatic apparatus for the induction hardening of parts of track links includes a frame for supporting the inductors which can oscillate in a horizontal plane above the links so as to enable the induction hardening of links of different shapes and dimensions, by alteration of the oscillating travel of the frame. A completely automatic system is also provided for locking the links in correspondence with the inductors, which is programmable in dependence on the shape and dimensions of the track links supplied to the hardening apparatus.

11 Claims, 9 Drawing Figures

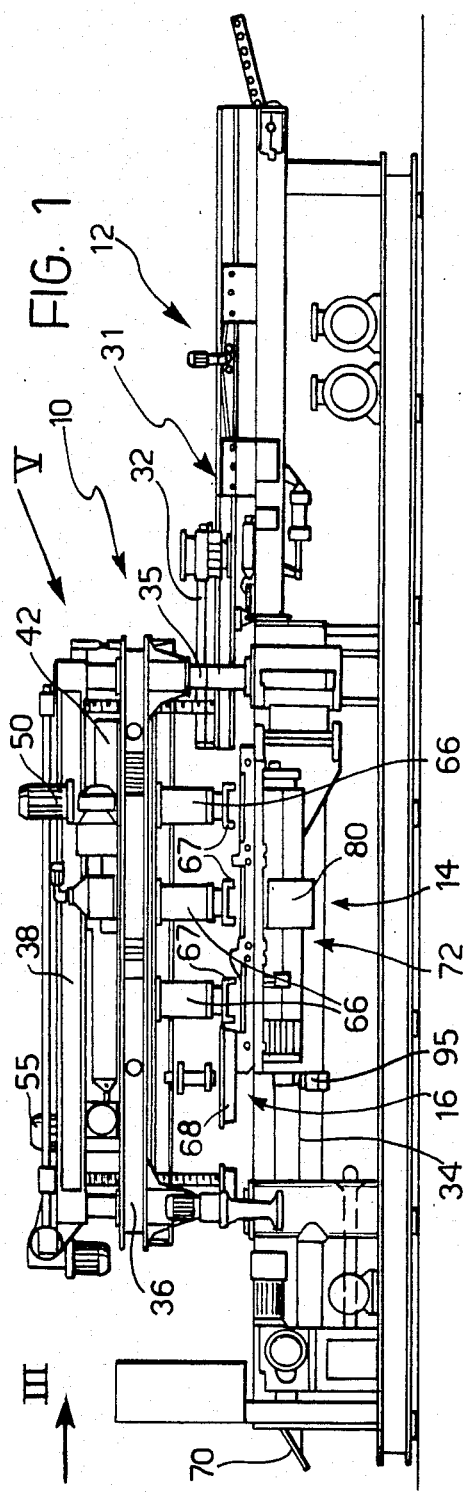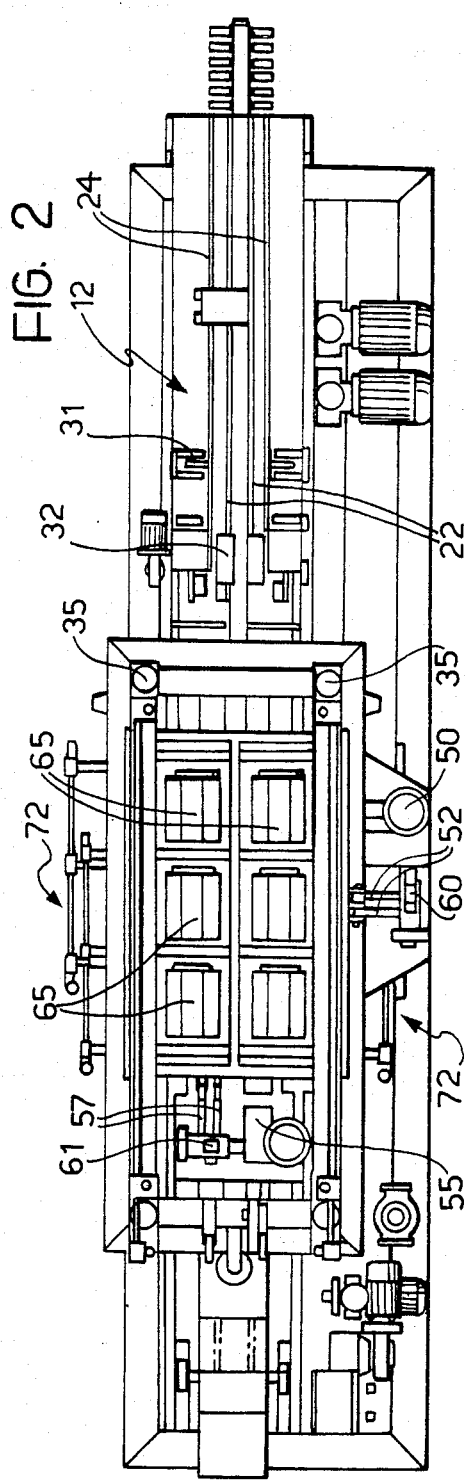

AUTOMATIC APPARATUS FOR INDUCTION HARDENING

The present invention relates to automatic apparatus for the induction hardening of parts of metal objects, particularly parts of track links, of the type comprising a fixed structure, inductor means, stepwise conveyor means for the objects, and rapid cooling means for the objects downstream of the inductor means.

Known apparatus of the type indicated above enables the hardening of objects which are the same as each other, variation in the shape and dimensions of the objects necessitating stoppage of the apparatus, replacement of the inductor means, and manual adjustment of the relative distance between the inductor means and the objects in order to ensure effective hardending of the objects themselves. These manual adjustments with the apparatus stopped require lengthy downtimes and result in a consequent drop in productivity.

The object of the present invention is to provide an automatic device for the induction hardening of parts of metal objects which does not have these disadvantages but is simple and cheap to operate.

According to the invention, this object is achieved by virtue of the fact that the inductor means are supported by a frame which is movable in two directions in a horizontal plane above the parts of the objects to be hardened, and that the apparatus further includes means for reciprocating the frame in the two directions so as to impart to the inductor means a substantially circular movement in a horizontal plane above the parts of the objects to be hardened, and means for moving the frame vertically so as to enable adjustment of the vertical distance between the objects and the inductor means.

By virtue of this characteristic, it is possible to harden objects of various dimensions inductively without changing the inductors and without the need for adjusting the apparatus in order to ensure effective induction heating of the objects. Indeed, with a single type of inductor having a substantially circular movement in a horizontal plane ensured by the apparatus, it is possible effectively to heat objects having a substantially identical shape but different dimensions, such as, for example, track links for earth moving equipment, etc., for which there is a wide range of dimensions although they are of substantially idential shapes.

According to another characteristic, the apparatus further includes means for automatically centering and clamping the objects in correspondence with the inductors, the means being programmable in dependence on the shape and dimensions of the objects to be hardened.

These means allow the automatic centering of the objects in correspondence with the inductors and effective locking thereof so as to avoid relative movements between the objects and the inductors during the induction heating, such movements possibly causing inadequate depth of hardening.

According to another characteristic, the drive means for the frame include means for adjusting the travel of the frame in each of the said directions, the means being programmable in dependence on the shape and dimensions of the objects to be hardened.

Thus, it is possible to arrange the apparatus for hardening objects of different dimensions simply and rapidly by operation of a simple control terminal.

Figure 4:
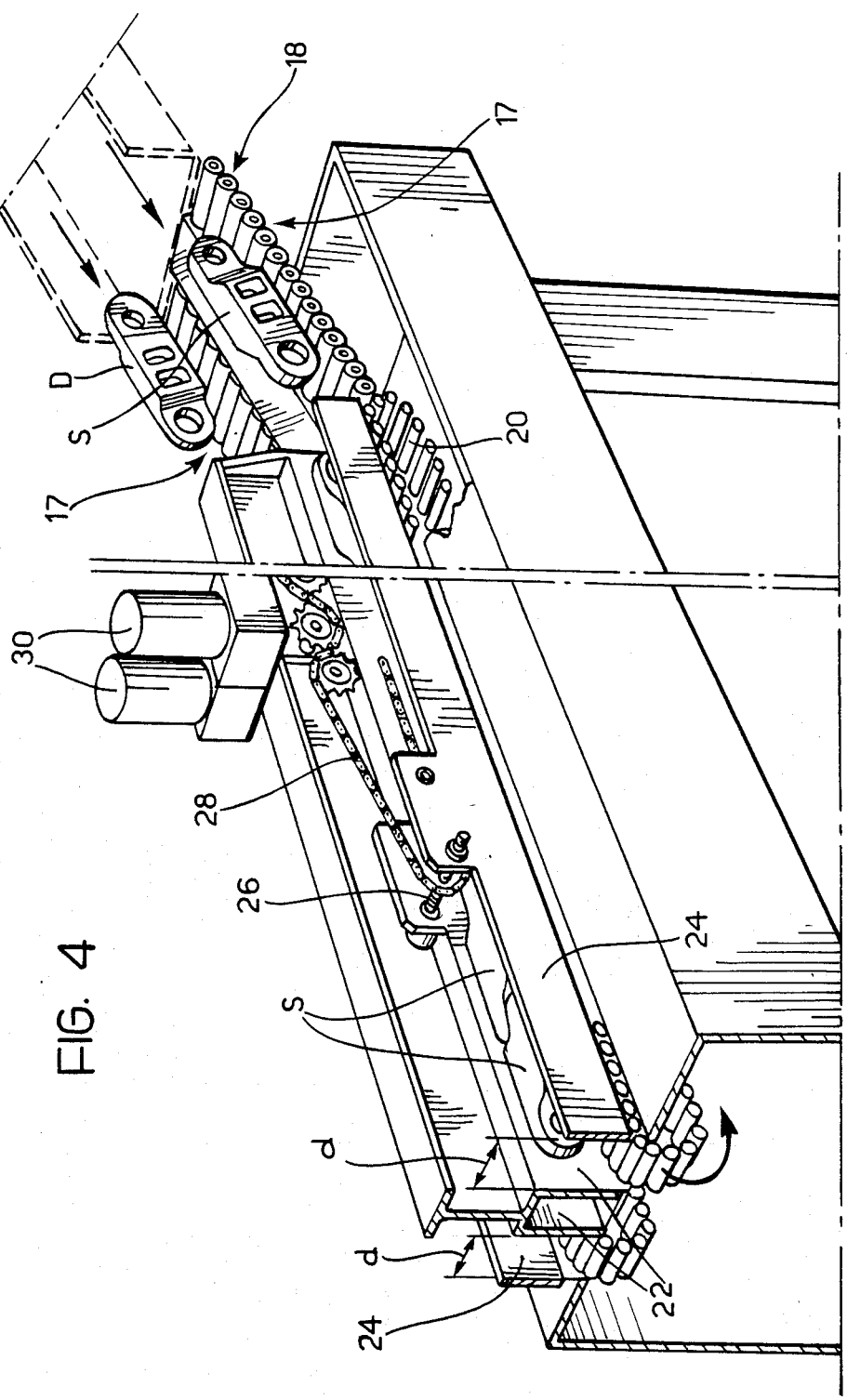
Figure 5:
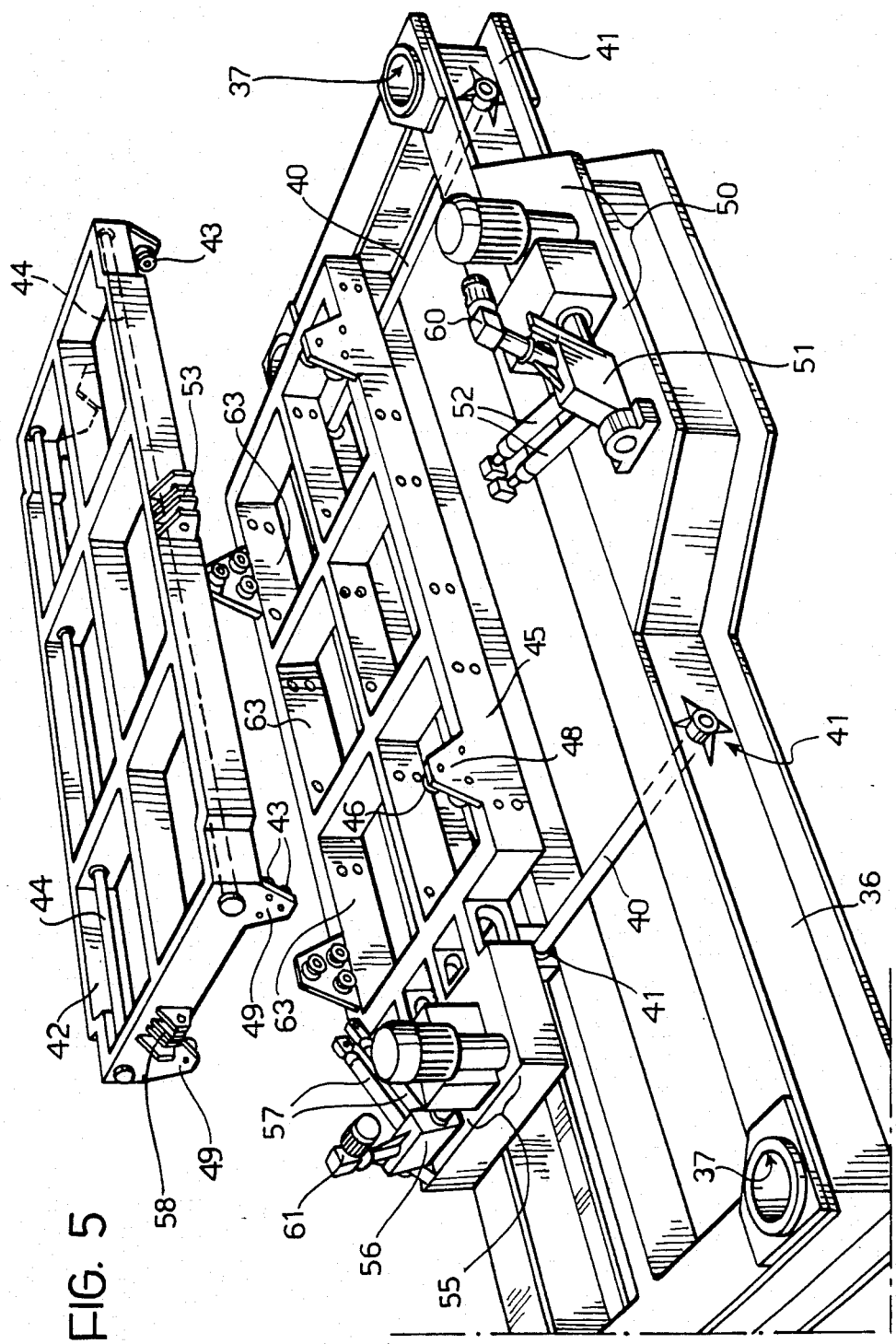
Figure 6:
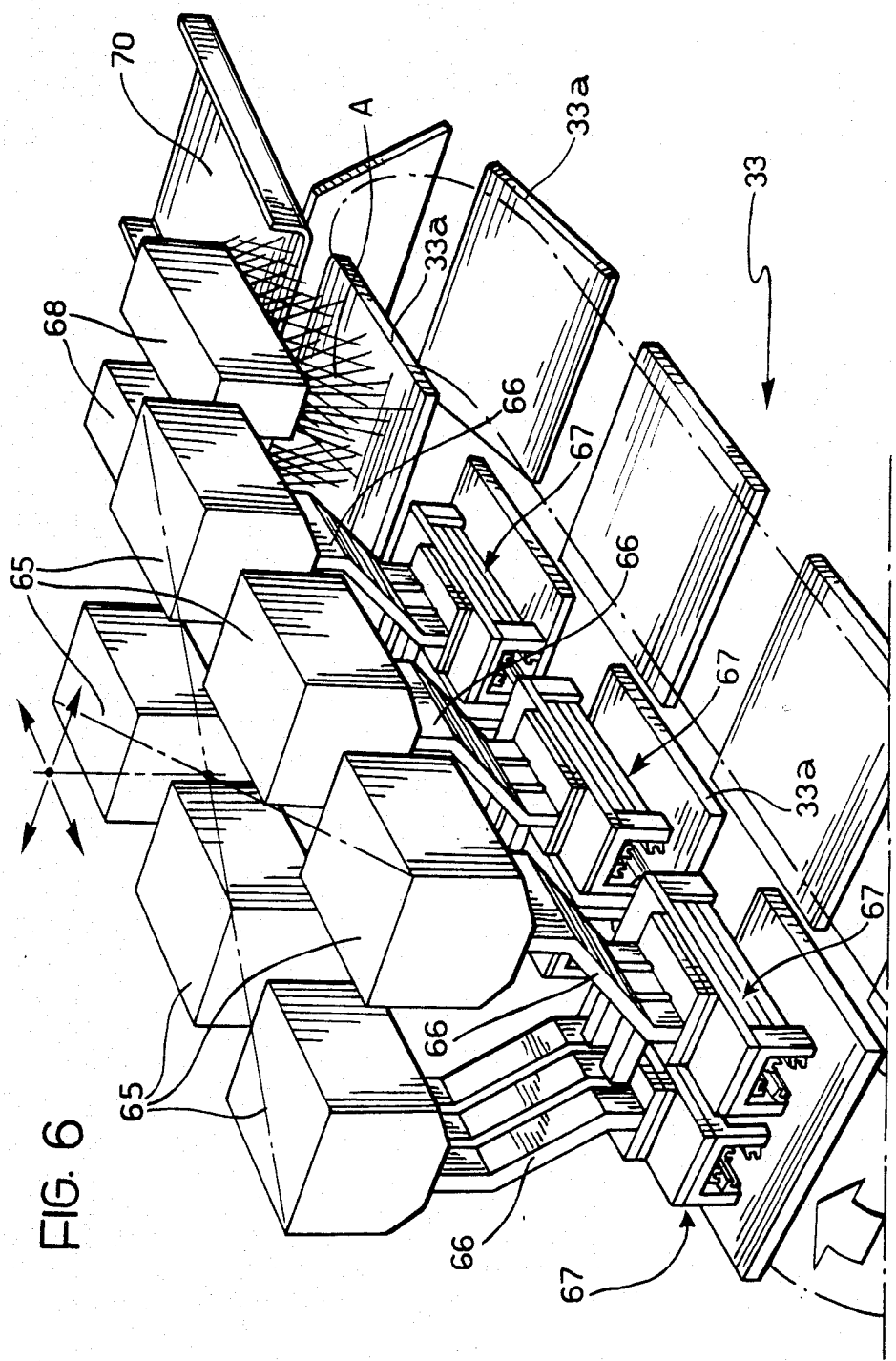
Figure 7:
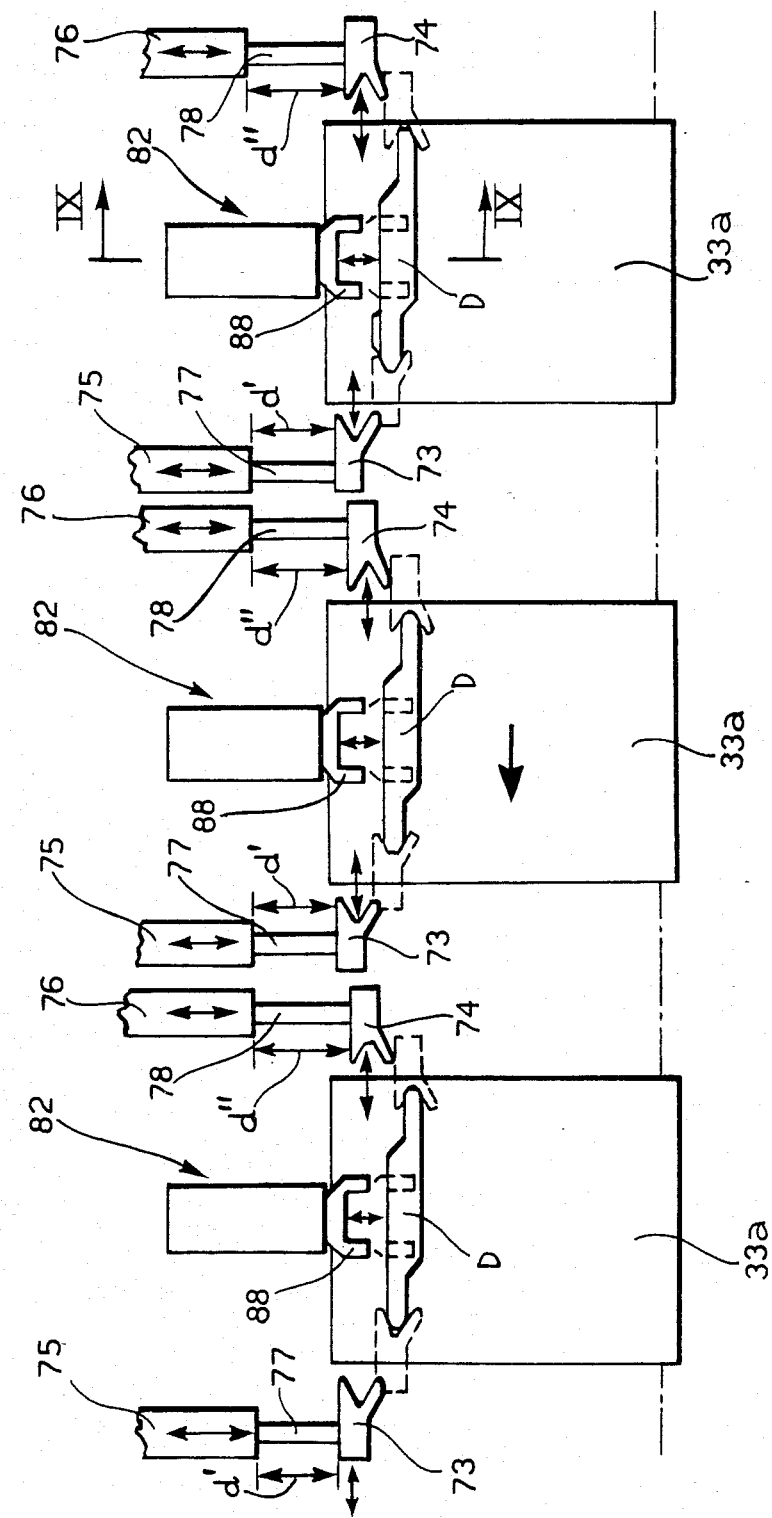
Figure 8:
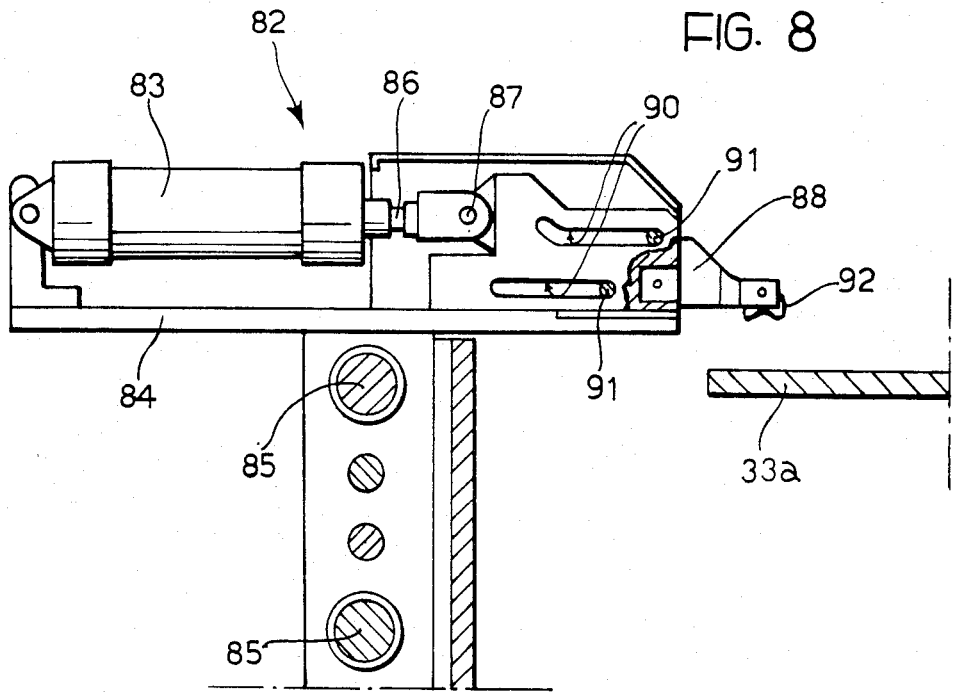
Figure 9:
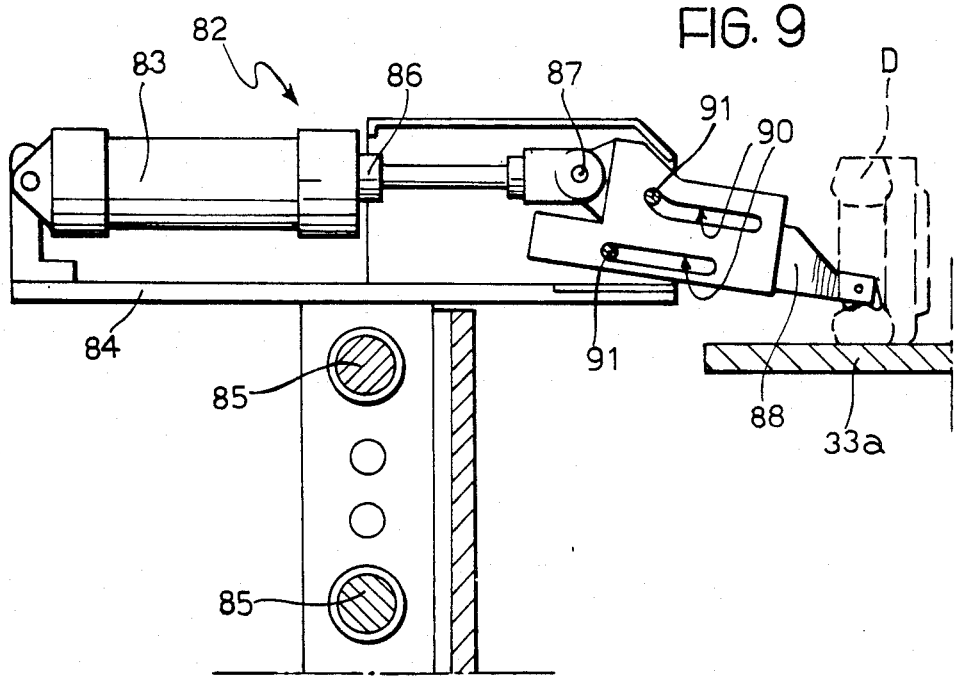

Further advantages and characteristics of the apparatus according to the present invention wil become clear from the detailed description which follows, provided purely by way of non-limiting example, with reference to the appended drawings, in which:

FIG. 1 is a side view of the apparatus,
FIG. 2 is a plan view of the apparatus,
FIG. 3 is a view taken in the direction III of FIG. 1,
FIG. 4 is a perspective of the supply system of the apparatus,
FIG. 5 is an exploded perspective view of the oscilating system for the inductors,
FIG. 6 is a schematic perspective view of the inductor means and their supplies,
FIG. 7 is a schematic plan view of the means for centering and locking the object relative to a single side of the apparatus,
FIG. 8 is a sectional view taken on the line IX—IX of FIG. 7, and
FIG. 9 is a view similar to FIG. 8, in which the locking member is illustrated in its active configuration.

With reference to the drawings, automatic apparatus for the induction hardening of track links for tracked vehicles is indicated 10. As known, the track links must be hardened on their backs, in correspondence with the parts which will slide on the track-tensioning wheel, the driving wheel and on the supporting rollers.

The apparatus 10 includes a supply zone 12, an induction heating zone 14, and a rapid cooling zone 16.

The supply zone 12, illustrated in detail in FIGS. 4 and 5, comprises two slides 17 constituted by idle rollers 18 on which right- and left- hand track links, indicated D and S respectively, are fed by gravity. The links D and S are conveyed from the slides 17 to a pair of braked-roller conveyors 20 which are side by side and guided laterally by fixed guides 22 and movable guides 24. The distance between the guides 22 and 24, indicated d in FIG. 5, may be adjusted by means of a screw-and-nut system 26 operated through a chain 28 by a geared motor 30. The adjustment of the distance d is achieved automatically according to the thickness of the links supplied to the device 10.

The braked-roller belt 20 arranges the links D and S in columns, so that they bear against each other and against stop means 31 arranged to ensure the supply of one pair of links D and S at a time to the hardening zone 14. The transfer of the links D and S from the supply zone 12 to the induction hardening zone 14 is achieved by means of a pick-up 32 of known type arranged to transfer one pair of links at a time from the supply zone 12 to a plate conveyor 33 located in the hardening zone 14 and cooling zone 16. The plate conveyor 33 advances stepwise in phase with the movement of the pick-up 32 and is supported by a fixed structure 34 of the apparatus 10.

The structure 34 has four vertical columns 35 in correspondence with which a frame 36 is slidable. The slidable frame 36 (FIG. 5) is rectangular in plan and is provided with guides 37 for its sliding on the columns 35. The columns 35 are fixed at their upper ends to a fixed frame 38 on which is mounted a geared motor 39 for driving the vertical translational movement of the slidable frame 36 on the columns 35. The transmission of motion from the geared motor 39 to the frame 36 is of a type known in itself and will not therefore be described.

The frame 36 has circular cylindrical guide bars 40 located transverse the direction of advance of the plate conveyor 33 and fixed at 41 to the frame itself. Above the frame 36 is a first auxiliary frame 42 slidingly supported by the bars 40 of the frame 36 through guide and bearing wheels 43. The wheels 43 are rotatably fixed to appendages 49 of the auxiliary frame 42. Thus, it is clear that, by virtue of the wheels 43 and the guides 40, the auxiliary frame 42 can slide transverse the direction of advance of the plate conveyor 33.

The auxiliary frame 42 also has guide bars 44 located in the plane of the frame itself and disposed longitudinally relative to the direction of advance of the plate conveyor 33.

Below the first auxiliary frame 42 and in substantially the same plane as the slidable frame 36 is a second auxiliary frame 45 slidably supported by the guide bars 44 through bearing and guide wheels 46. The wheels 46 are rotatably fixed to appendages 48 of the auxiliary frame 45. It is thus clear that the second auxiliary frame 45 can slide longitudinally relative to the first auxiliary frame 42 and transversely of the slidable frame 36 together with the auxiliary frame 42.

To the side of the slidable frame 36 and supported by the frame itself is a geared motor-oscillator unit 50 which is connected to a system comprising a crank 51 and connecting rods 52 articulated at 53 to the first auxiliary frame 42. Similarly, a geared motor-oscillator unit 56 is fixed to the second auxiliary frame 45 and is connected to a system comprising a crank 56 and connecting rods 57 articulated at 58 to the auxiliary frame 42. The crank systems 51 and 56 have respective geared motors 60 and 61 for adjusting automatically the length of the crank arm and hence the travel of the transverse oscillation of the auxiliary frame 42 and the longitudinal oscillation of the auxiliary frame 45.

The frame 45 is thus given a substantially circular movement resulting from the combination of the movements of the frame 42 relative to the frame 36 and of the frame 45 itself relative to the frame 42.

Supply sources 65 are fixed in respective spaces 63 in the frame 45 and, through connecting conductors 66, support inductor elements 67 located above the plate conveyor 33. All the supply sources 65 and their inductor elements 67 can thus be made to oscillate in the directions indicated by the arrows in FIG. 6, by means of the geared motor-oscillator unit 50 and 55. The distance between the inductor elements 67 and the plates 33a of the plate conveyor 33 can be varied by means of the vertical movement of the frame 36 driven by the geared motor 39.

Downstream of the inductor elements 67, in correspondence with the cooling zone 16, cooling showers 68 are provided which are supported by the slidable frame 36. Downstream of the plate conveyor 33 is an inclined plane 70 on which the hardened links slide under gravity and leave the apparatus 10. Laterally and on both sides of the plate conveyor 33 are means 72 for centering and clamping the links on the plates 33a in correspondence with the inductor elements 67. The means 72 comprise right- and left-hand centering tools (for an observer located laterally of the conveyor 33) 73 and 74 respectively, which can effect a transverse approach movement programmable according to the dimensions of the links D and S, and a longitudinal movement for taking up the links themselves. The centering tools 73 and 74 are V-shaped for engaging the ends of the links and are connected to respective shafts 75 and 76 driven for transverse movement, for example by pressurised-fluid actuators (not illustrated) having a fixed stroke. In order to adjust the transverse centered position of the links, rods 77 and 78 mounted within the shafts 75 and 76 are joined to the centering tools 73 and 74 and are driven, for example by a screw actuator, so as to be able to vary the distances indicated d' and d", in order to alter the position of centering, indicated in broken outline in FIG. 7, according to the different types of links on the plates 33a.

To advantage, the longitudinal centering movement may be achieved by means of a pneumatic actuator 80 which makes all the centering tools 73 and 74 move simultaneously towards the front and rear ends of each link.

In order to clamp the links, retaining members 82 are provided which are also located laterally of the plates 33a, and each of which includes (see FIGS. 8 and 9) a pressurised- fluid actuator 83 supported by a plate 84 slidable on guides 85 located parallel to the direction of advance of the plate conveyor 33. Each actuator 83 has a shaft 86 articulated at 87 to a clamping tool 88 having guides with cam profiles 90 slidable relative to pins 91 fixed to the plate 84. The cams 90 and the pins 91 allow ends 92 of the clamping tool 88 to travel, under the action of the fluid actuator 83, a path of transverse translational movement and vertical displacement, so as to come into contact with and force the link (indicated in broken outline in FIG. 9) against the respective plate 33a. The plates 84 may slide simultaneously on the guides 85 under the action of a geared motor 95, through, for example, a screw-and- nut mechanism (not illustrated). The longitudinal translational movement of the retaining members 82 is an automatic adjustment movement and serves to make the clamping effective for different types of links having different shapes, without the need to replace the clamping ends 92.

The operation of the apparatus will now be described briefly. An operator skilled in the control of the automatic apparatus 10 sets in the data relating to a type of link or possibly identifies the type of link to be hardened by a characteristic symbol, by means of a terminal (not illustrated). The other adjustments effected automatically by the apparatus relate to the oscillating travel of the frames 42 and 45 by means of the geared motors 60 and 61, the distance between the inductor elements 67 and the plates 33a of the conveyor by means of the movement of the frame 36 by the geared motor 39, the adjustment of the distances d' and d" relating to the centered position of the centering tools 73 and 74 and the longitudinal position of the retaining members 82 by means of an overall movement of the members themselves by means of the geared motor 95. In continuing the description of the operation of the apparatus 10, reference will be made solely to the right-hand side and to the right-hand links D, the operation of the other side for hardening of the left-hand links S being exactly the same.

The links D deposited on the plates 33a by the pick-up 32 as a result of the successive stepwise advances of the conveyor 33 come into correspondence with the inductor elements 67. With the conveyor 33 stopped and the auxiliary frames 42 and 44 stationary, the shafts 75 and 76 and their centering tools 73 and 74 come into operation and first move transversely and then longitudinally, centering each link D perfectly in correspondence with the respective inductor element 67. It is clear that the movements described for one pair of centering tools 73 and 74 are also identical for the other two pairs relative to each side of the apparatus 10, in synchronism with both the pick-up 32 and the conveyor 33.

Once centering has been effected, the retaining members 82 come into play and, with their ends 92, clamp each link D in contact with the respective plate 33a. Subsequently, the geared motor-oscillator units 50 and 55 come into action and the inductor elements 67 are energised. The inductor elements 67 are essentially U-sectioned so as to surround the upper part of the links D, and move towards and away from the surface of the links D in their circular movement, with a so-called brushing movement. During this brushing, the upper part of the links D are heated until they reach a predetermined temperature (red heat). Subsequently, the movement of the auxiliary frames 42 and 45 is stopped, the retaining members 82 and the centering tools 73 and 74 are retracted, and the conveyor 33 is advanced by one step. The operations described above are then repeated in exactly the same manner.

At the outlet from the last inductor elements, the upper parts of the links D are hit by jets of water A so as to finish the hardening process.

The choice of using several inductor elements in series results from reasons of increased productivity and from metallurgical reasons to achieve a greater depth of hardening. Indeed, in the transfer from one inductor element to the next, the inductance-heated surface zone (skin effect) transmits part of the heat obtained to the underlying metal by conduction so that a greater thickness of material reaches a temperature suitable for hardening.

The principle of the invention remaining the same, it is understood that the details of realization and forms of embodiment may be varied widely, without thereby departing from the scope of the present invention.

I claim:

1. Automatic apparatus for induction hardening of parts of metal objects, comprising a fixed structure, inductor means for induction heating of the parts of metal objects to be hardened in the structure, stepwise conveyor means for advancing the objects past the inductor means, and rapid cooling means for cooling the objects downstream of the inductor means, wherein the inductor means is supported by a frame which is movable during the induction heating in two directions substantially perpendicular to each other in a horizontal plane above the parts of the objects to be hardened, means for reciprocating the frame in the two directions so as to impart to the inductor means during the induction heating a substantially circular movement in the horizontal plane above the parts of the objects to be hardened, and means for moving the frame vertically so as to enable adjustment of the vertical distance between the objects and the inductor means.

2. Apparatus according to claim 1, further comprising means for automatically centering and clamping the objects in correspondence with the inductors, said centering and clamping means being programmable in dependence on the shape and dimensions of the objects to be hardened.

3. Apparatus according to claim 2, wherein the means for centering and clamping the objects to be hardened in correspondence with the inductor means include gripper members for engaging of each object, and means for moving the gripper means in both a transverse direction and a longitudinal direction relative to the direction of advance of the conveyor means, so as to enable the gripper means to move between a rest position to the side of the conveyor means and a position of engagement with the objects to be hardened.

4. Apparatus according to claim 3, wherein the means for centering and clamping the objects to be hardened in correspondence with the inductor means include retaining members arranged to engage a corresponding part of the objects to be hardened, so as to push each object vertically against a corresponding part of the stepwise conveyor means during the induction heating, and means for moving the retaining members in both a transverse direction and a vertical direction relative to the direction of advance of the objects on the conveyor means.

5. Apparatus according to claim 4, wherein the retaining members comprise pressurised-fluid actuators having rods and clamping tools provided with cam guide systems, the rods of the actuators being articulated at their ends to the clamping tools.

6. Apparatus according to claim 1, wherein the reciprocating means for the frame include means for adjusting the travel of the frame along each of the said directions, the adjusting means being programmable in dependence on the shape and dimensions of the object to be hardened.

7. Apparatus according to claim 1, wherein the frame is supported by a structure which is movable vertically relative to the fixed structure and includes a first auxiliary frame, guides provided on the vertically movable structure on which the first auxiliary frame is slidable, a second auxiliary frame which supports the inductor means, and guides provided on the first auxiliary frame on which the second auxiliary frame is slidable.

8. Apparatus according to claim 7, wherein the first auxiliary frame is slidable transverse the direction of advance of the objects on the conveyor means, and the second auxiliary frame is slidable longitudinally of this direction.

9. Apparatus according to claim 7, further comprising means for moving the first auxiliary frame including a geared motor-fixed oscillator unit supported by the vertically-movable structure and connected by connecting rods to the first auxiliary frame, and means for moving the second auxiliary frame including a geared motor-movable oscillator unit supported by the first auxiliary frame and connected by connecting rods to the second auxiliary frame.

10. Apparatus according to claim 9, wherein the means for moving the first and second auxiliary frames comprise auxiliary geared motors adapted to vary the length of the crank arm of each oscillator.

11. Apparatus according to claim 1, wherein the stepwise conveyor means for the objects to be hardened comprise a plate conveyor, each plate being intended to support at least one object to be hardened.

* * * * *